(12) United States Patent
Shibazaki

(10) Patent No.: US 8,212,986 B2
(45) Date of Patent: Jul. 3, 2012

(54) LCD DEVICE, DISPLAY METHOD THEREOF AND ELECTRONIC APPARATUS EMPLOYING LCD DEVICE

(75) Inventor: Minoru Shibazaki, Hyogo (JP)

(73) Assignee: Chimei Innolux Corporation (TW)

( * ) Notice: Subject to any disclaimer, the term of this patent is extended or adjusted under 35 U.S.C. 154(b) by 436 days.

(21) Appl. No.: 12/432,486

(22) Filed: Apr. 29, 2009

(65) Prior Publication Data

US 2009/0273723 A1 Nov. 5, 2009

(30) Foreign Application Priority Data

May 1, 2008 (JP) ................................. 2008-119943

(51) Int. Cl.
*G02F 1/1333* (2006.01)
(52) U.S. Cl. ........... 349/181; 349/84; 349/177; 349/179
(58) Field of Classification Search ........................ None
See application file for complete search history.

(56) References Cited

U.S. PATENT DOCUMENTS

| | | | | |
|---|---|---|---|---|
| 4,278,328 A | * | 7/1981 | Mukoh et al. ................. | 349/130 |
| 4,674,841 A | * | 6/1987 | Buzak ............................ | 349/97 |
| 4,844,569 A | * | 7/1989 | Wada et al. ................... | 349/117 |
| 4,930,877 A | * | 6/1990 | Kano et al. .................... | 349/181 |
| 5,139,340 A | * | 8/1992 | Okumura ........................ | 349/99 |
| 5,191,454 A | * | 3/1993 | Iijima et al. .................... | 349/33 |
| 5,495,355 A | * | 2/1996 | Konuma ........................ | 349/132 |
| 5,737,047 A | * | 4/1998 | Sakamoto et al. ............ | 349/119 |
| 5,838,408 A | * | 11/1998 | Inoue et al. .................... | 349/118 |
| 6,014,195 A | * | 1/2000 | Sakamoto et al. ............. | 349/96 |
| 6,295,108 B1 | * | 9/2001 | Kaneko .......................... | 349/115 |
| 2007/0080912 A1 | * | 4/2007 | Asao ............................... | 345/87 |
| 2007/0195034 A1 | * | 8/2007 | Hayashi et al. ................. | 345/87 |

FOREIGN PATENT DOCUMENTS

JP 63301023 12/1988

OTHER PUBLICATIONS

Office Action from corresponding application No. JP 2008-119943.

* cited by examiner

*Primary Examiner* — Mike Stahl
(74) *Attorney, Agent, or Firm* — Lowe Hauptman Ham & Berner, LLP

(57) ABSTRACT

An LCD device comprises upper substrate, lower substrate, and a liquid crystal (LC) cell disposed therebetween. The LC cell comprises liquid crystals. According to the present invention, in the LCD device which applies voltage to the liquid crystals to control transmissive light for proceeding display, the liquid crystals are applied with a voltage larger than a predetermined voltage for proceeding display. The reflect light and the transmissive light of the liquid crystals are the predetermined color under a condition without applying the voltage thereto.

12 Claims, 6 Drawing Sheets

(A)

(B)

(C)

(A)

(B)

(C)

(A)

(B)

(A)

(B)

LCD DEVICE, DISPLAY METHOD THEREOF AND ELECTRONIC APPARATUS EMPLOYING LCD DEVICE

RELATED APPLICATIONS

The present application is based on, and claims priority from, Japanese Application Number 2008-119943, filed May 1, 2008, the disclosure of which is hereby incorporated by reference herein in its entirety.

BACKGROUND OF THE INVENTION

1. Field of the Invention

The present invention generally relates to an LCD device, a display method thereof and an electronic device employing the LCD device, and more particularly to an LCD device applying a voltage to liquid crystals to control transmissive light of the liquid crystals for display, a display method thereof and an electronic apparatus employing the LCD device.

2. Description of Prior Art

With advantages of electrical power saving and lightweight, an LCD device is used as being the monitor of the electronic apparatuses, such as, the computers, the mobile phones or the televisions. The LCD device can be considered as an upper substrate and a lower substrate sandwiching a layer of liquid crystals. The upper and lower substrates are transparent and have spacers to maintain regular spacing therebetween. With voltages applied to upper and lower electrodes formed on the upper and lower substrates respectively, directions of the liquid crystals can be determined to control transmissive light through the liquid crystals. Examples can be seen in Japan Patent Publication Nos. 2007-206469 and 2007-192854.

The LCD device is installed in the electronic apparatus for displaying an image, a text content and so forth in a driving mode. However, there is nothing revealed on a displaying area of the LCD device when the power of the LCD device is off and no voltage is applied to the liquid crystals in the LCD device according to prior arts.

Generally, the LCD device is installed in the electronic apparatus and the display area of the LCD device occupies certain appearance of the electronic apparatus. Besides, the design for the appearance is also innovated in just recent years. The body casing and appearance of the electronic devices also become fantastically colorful even more. As aforementioned, nothing is revealed on the display area when the power of the LCD device is off at the present time. Only lifeless black or other similar colors are remained to be seen.

With size growing requirement of the display area for the electronic apparatus, the colors of the display area get more conspicuous and more effective to the design for the appearance of the electronic apparatus. Accordingly, there presents a need for the display area color to be designable and matching with the appearance of the electronic apparatus when the power of the LCD device is off.

SUMMARY OF THE INVENTION

An objective of the present invention is to provide an LCD device of which a color of transmissive light and reflected light of liquid crystals is a predetermined color when the voltage is not applied to the liquid crystals. The present invention is also to provide the display method of such an LCD device and an electronic apparatus employing the same.

The LCD device of the present invention comprises an upper substrate, a lower substrate and a liquid crystal cell (hereafter, "cell"). The cell contains liquid crystals and is disposed between the upper substrate and the lower substrate. Furthermore, transmissive light of the liquid crystals can be controlled for display when a voltage is applied to the liquid crystals. A color of transmissive light and reflected light of the liquid crystals is a predetermined color when the voltage is not applied to the liquid crystals when the LCD device is under an off status. The present invention also provides an electronic apparatus comprising the aforesaid LCD device.

Moreover, the present invention also provides a display method of the aforesaid LCD device for display. The display method comprises a step: controlling conditions of the cell to change the color of the transmissive light and reflected light of the liquid crystal into a predetermined color when the voltage is not applied to the liquid crystal under an off status.

According to the present invention, by controlling the retardation of the cell, the color of the reflected light of the liquid crystals can be a predetermined color when the voltage is not applied to the liquid crystal under an off status. Accordingly, a display area of the LCD device can show the predetermined color when the LCD device is powered off or not proceeding display. Consequently, an aesthetic design for the appearance of the electronic apparatus employing the LCD device of the present invention can be realized.

DETAILED DESCRIPTION OF THE INVENTION

Figure 1:
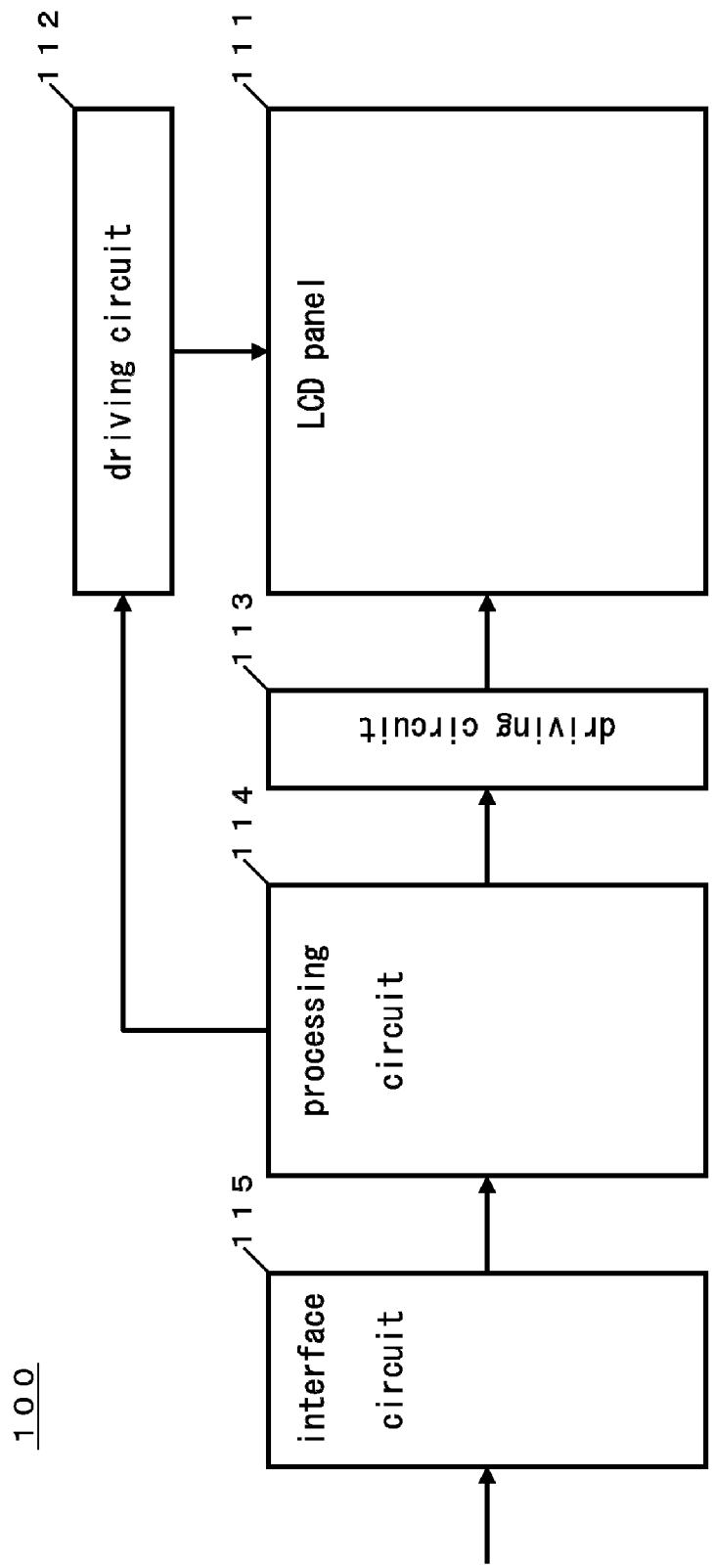
FIG. 1 depicts a functional block diagram of an embodiment according to the present invention.
Figure 2:
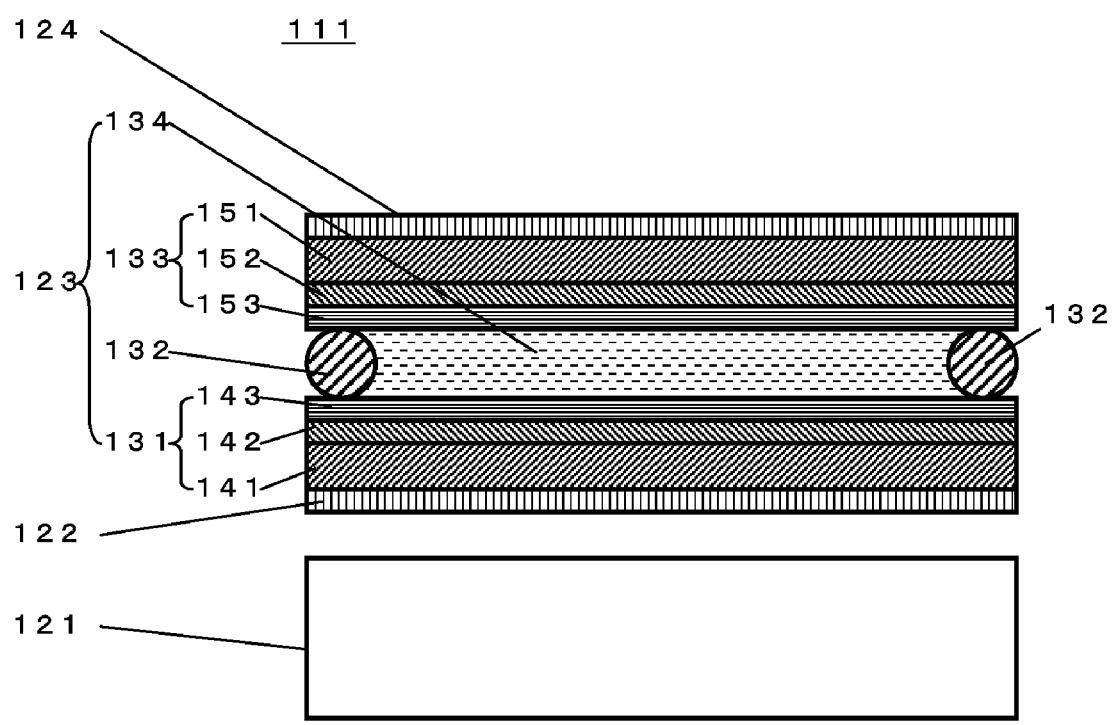
FIG. 2 depicts a diagram of the LCD panel 111 shown in FIG. 1.

Please refer to FIG. 1 and FIG. 2. FIG. 1 depicts a functional block diagram of an embodiment according to the present invention. FIG. 2 depicts a diagram of the LCD panel 111 shown in FIG. 1. The LCD apparatus 100 of the presently describing embodiment comprises LCD panel 111, driving circuits 112 and 113, a processing circuit 114 and an interface circuit 115. The LCD panel 111 comprises a backlight source 121, a polarizing plate 122, an LCD panel main body 123 and a polarizing plate 124. The backlight source 121 generates light in a driving mode. The light generated from the backlight source 121 is incident to the polarizing plate 122. The polarizing plate 122 makes incident light from the backlight source 121 into linear polarized light which is incident to the LCD panel main body 123. The LCD panel main body 123 comprises a lower transparent substrate 131, spacers 132, an upper transparent substrate 133 and liquid crystals 134. The lower transparent substrate 131 and upper transparent substrate 133 are disposed with the spacers 132 therebetween. A regular spacing between the lower transparent substrate 131 and upper transparent substrate 133 can be maintained by the spacers 132. The liquid crystals 134 are sandwiched by the lower transparent substrate 131 and upper transparent substrate 133 to form a liquid crystal cell (hereafter, simply "cell").

The lower transparent substrate 131 comprises a glass 141, a lower electrode 142 and an alignment layer 143. The lower electrode 142 is formed on the glass 141 facing the upper transparent substrate 133. The lower electrode 142 is employed to constitute an electrode of a pixel, coupled with wirings (not shown) via TFT (not shown) to apply a voltage to the liquid crystals 134. The aforesaid wirings are coupled to the driving circuits 112, 113. The alignment layer 143 is formed above the lower electrode 142 contacting with the liquid crystals 134 to decide alignment directions for the liquid crystals 134.

The upper transparent substrate 133 comprises a glass 151, an upper electrode 152 and an alignment layer 153. The upper electrode 152 is formed on most of the glass 151 facing the lower transparent substrate 131. The upper electrode 152 can provide a reference voltage, ground, for example. A driving voltage is provided to the lower electrode 142 and the upper electrode 152 to apply a voltage to the liquid crystals 134. The alignment layer 153 is formed beneath the upper electrode 152 contacting with the liquid crystals 134 to decide alignment directions for the liquid crystals 134.

The driving circuit 112 applies a voltage to data lines formed on the lower transparent substrate 131. The driving circuit 113 applies voltages to scan lines formed on the lower transparent substrate 131 and common lines. With conducting TFT through the driving circuit 113, a voltage corresponding to a signal from the driving circuit 112 is applied to the lower electrode 142. A voltage is generated between the lower electrode 142 and the upper electrode 152 and applied to the liquid crystals 134. The driving circuit 112 applies a voltage between a first voltage and a second voltage to the lower electrode 142. For example, the first voltage can be 2 volts and the second voltage can be 5 volts.

Furthermore, in a condition that the liquid crystals 134 are positive nematic liquid crystals, if the first voltage is applied to the lower electrode 142 to result in a transparent status, for example, the light from the backlight source 121 penetrates the LCD panel 111 to show a white color on a display area of the LCD panel 111. Alternatively, the liquid crystals 134 also can be negative nematic liquid crystals. Species of the liquid crystals 134 are not limited in the present invention as long as phase retardation of the cell is controllable. Besides, if the second voltage is applied to the lower electrode 142, the liquid crystals 134 then becomes an opaque status to conceal the light from the backlight source 121, so that a black color is shown on display area of the LCD panel 111. By changing the voltage applied to the lower electrode 142 between the aforesaid first voltage and the second voltage, transmissive amount of the light from the backlight source 121 can be controlled to appear different gray scales.

Figure 3:
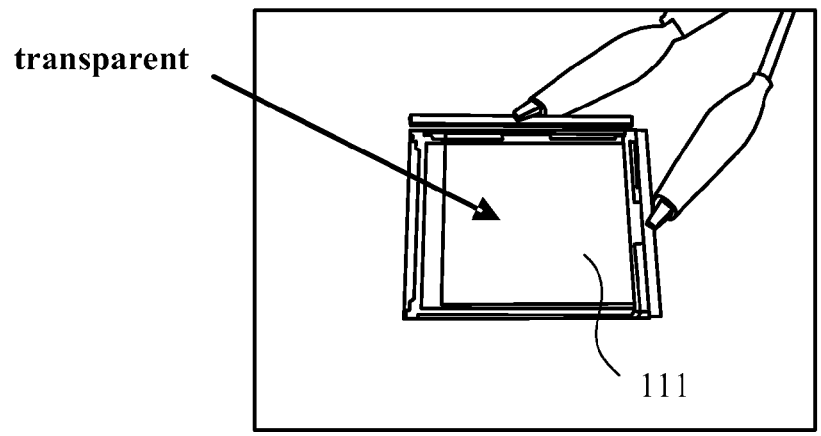
FIGS. 3A~3C illustrate drawings of operating the LCD panel 111 shown in FIG. 1 according to an embodiment of the present invention.
Figure 3:
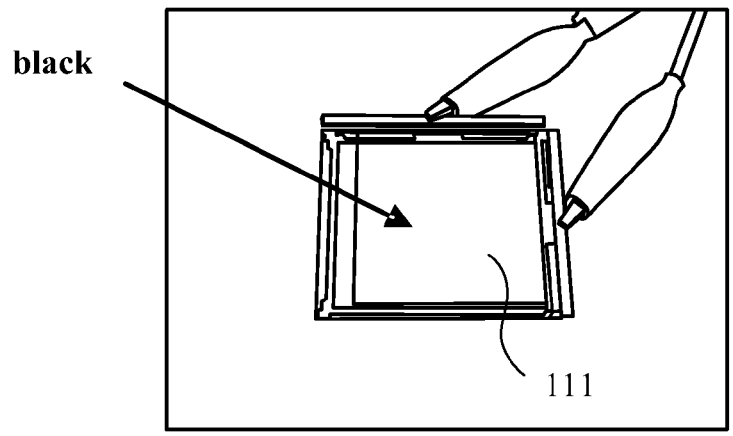
Figure 3:
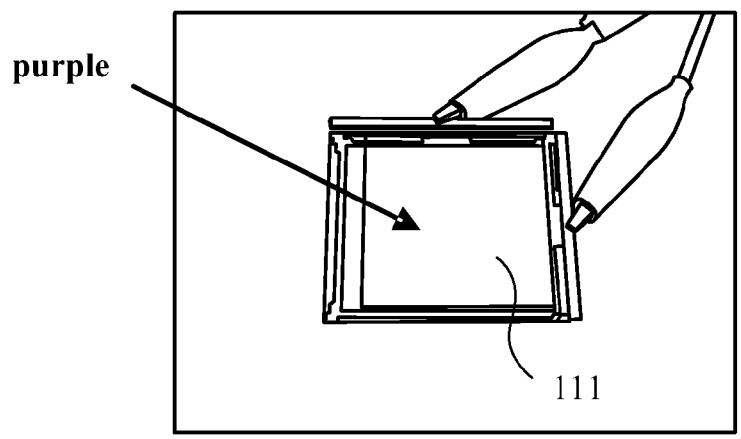

Please refer to FIGS. 3A~3C, which illustrate drawings of operating the LCD panel 111 shown in FIG. 1 according to an embodiment of the present invention. Two clamps shown in figures are employed for providing voltage to the liquid crystals 134 of the LCD panel 111. FIG. 3A shows the display status when the first voltage, 2 volts, being applied to the liquid crystals 134. FIG. 3B shows the display status when the second voltage, 5 volts, being applied to the liquid crystals 134. FIG. 3C shows the display status when no voltage is applied to the liquid crystals 134. As shown in FIG. 3A, the liquid crystals 134 become a first status, i.e. transparent status. In the transparent status, the display area of the LCD panel appears a white color if the backlight source 121 is on. As shown in FIG. 3B, the liquid crystals 134 become a second status, i.e. an opaque status. In the opaque status, the display area of the LCD panel appears a black color. Specifically, the liquid crystals 134 become a third status which is applied with no voltage, the display area of the LCD panel shows a purple color as shown in FIG. 3C. The color shown by the display area of the LCD panel in the foregoing third status is generated by a reflected purple light of the liquid crystals 134. The color of the reflected light by the liquid crystals 134 can be set by a birefringence of the liquid crystals 134 and a thickness of the cell.

Following explanations are about conditions to predetermine the color of the reflected light by the liquid crystals 134 when no voltage is applied thereto. Three cell conditions will be described as follows.

In a first cell condition, a twisted angle of the liquid crystals 134 is at zero degree. The alignment direction of the alignment layer 143 and that of the alignment layer 153 are parallel (zero degree). The driving voltage to the liquid crystals 134 is 0 volt in an off mode, and 2~5 volts in a driving mode. The phase retardation is of a range of 400 nm~1000 nm when the LCD device is a transmissive LCD and the phase retardation is of a range of 200 nm~500 nm when the LCD device is a reflective LCD.

In a second cell condition, a twisted angle of the liquid crystals 134 is at zero degree. The alignment directions of the alignment layer 143 and that of the alignment layer 153 are anti-parallel (180 degree). The driving voltage to the liquid crystals 134 is 0 volt in an off mode, and 2~5 volts in a driving mode. The phase retardation is of a range of 400 nm~1000 nm when the LCD device is a transmissive LCD and the phase retardation is of a range of 200 nm~500 nm when the LCD device is a reflective LCD.

In a third cell condition, a twisted angle of the liquid crystals 134 is at 180 degree. The alignment directions of the alignment layer 143 and that of the alignment layer 153 are parallel (zero degree). The driving voltage to the liquid crystals 134 is 0 volt in an off mode, and 2~5 volts in a driving mode. The phase retardation is of a range of 400 nm~1000 nm when the LCD device is a transmissive LCD and the phase retardation is of a range of 200 nm~500 nm when the LCD device is a reflective LCD.

As aforementioned, the phase retardation is configurable by deciding the birefringence of the liquid crystals and the thickness of the cell. For instance, the birefringence is 0.1 and the thickness of the cell is 10 μm, the phase retardation can be 1000 nm. Moreover, the phase retardation can be 400 nm when the birefringence is 0.1 and the thickness of the cell is 4 μm.

Figure 4:
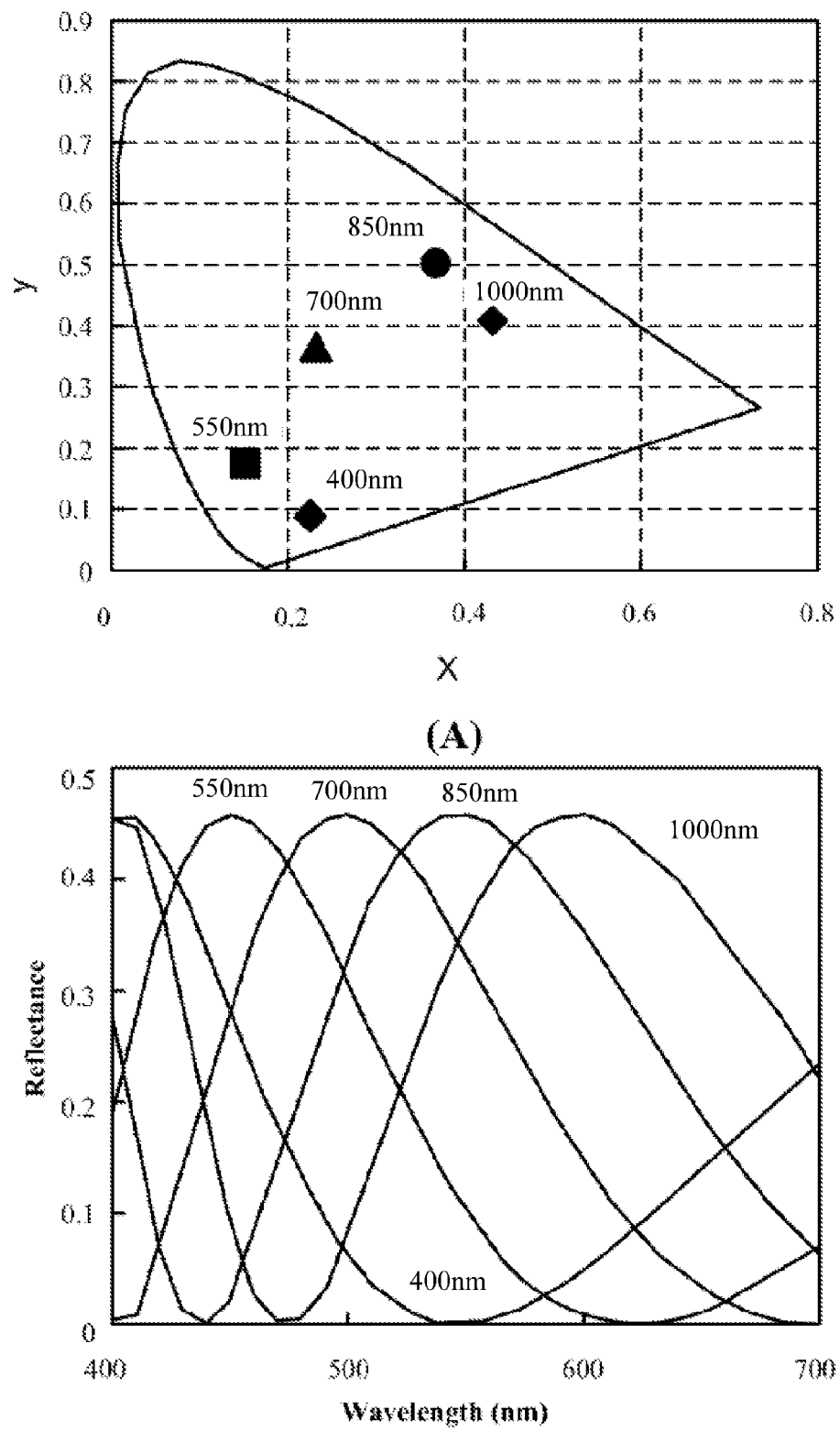
FIG. 4A and FIG. 4B show diagrams about hue and color status of the LCD panel 111 shown in FIG. 1.

Please refer to FIG. 4A and FIG. 4B, which show diagrams about hue and color status of an LCD panel 111 shown in FIG. 1. FIG. 4A shows the hue of transmissive light and reflected light of the LCD panel 111. FIG. 4B shows a graph of the phase retardation relative with the reflectance when the wavelength of the light is in a range of 400~700 nm. The following are explanations for the five conditions that the phase retardation is 400 nm, 550 nm, 700 nm, 850 nm and 1000 nm, respectively.

As shown in FIG. 4A, the LCD panel shows a red color as the phase retardation is 400 nm. The LCD panel shows a green color as the phase retardation is 550 nm. The LCD panel shows a blue color as the phase retardation is 700 nm. The LCD panel shows an orange color as the phase retardation is 850 nm. The LCD panel shows a purple color as the phase retardation is 1000 nm. The characteristic of the reflectance relative with the wavelength is shown in FIG. 4B. According to the aforesaid first to third cell conditions, the hue of light colors shown by the LCD panel when no voltage is applied thereto are illustrated in FIG. 4A. As aforementioned, the LCD panel can show a predetermined color when no voltage is applied thereto by controlling the phase retardation within a range of 400 nm~1000 nm. Either the backlight source 121 is on or off, the liquid crystals 134 still can reflect the light of the predetermined color when no voltage is applied thereto, i.e. the color of reflected light and transmissive light of the liquid crystal 134 is the predetermined color when no voltage is applied to the liquid crystal 134.

Figure 5:
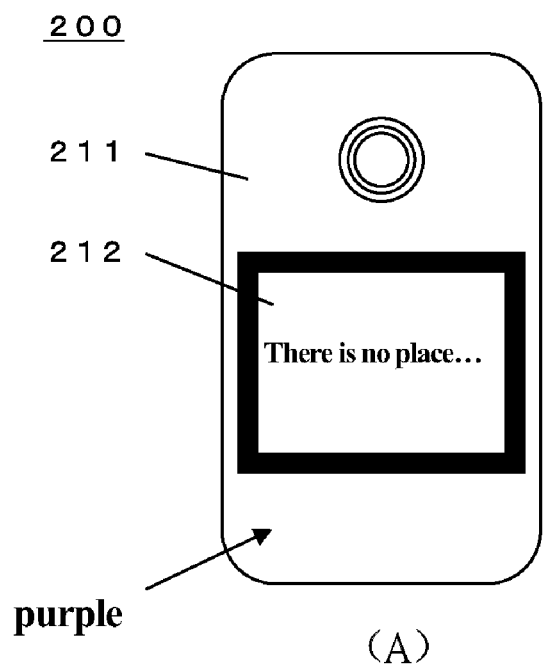
FIG. 5A and FIG. 5B show an illustration of an application example according to the present invention.
Figure 5:
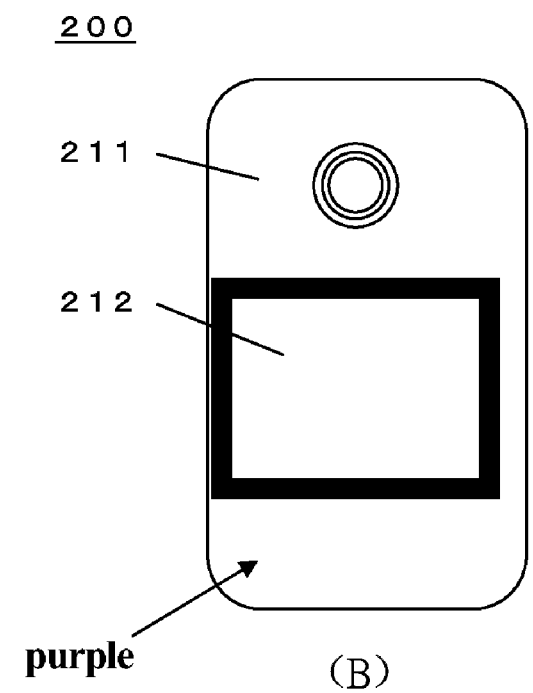

FIG. 5A, FIG. 5B, FIG. 6A and FIG. 6B show illustrations of application examples according to the present invention. FIG. 5A and FIG. 5B show an example that the LCD device 100 is employed as a monitor of a mobile phone 200. FIG. 5A shows that the LCD panel is in a driving mode. FIG. 5B shows that no voltage is applied to the LCD panel 212. The LCD device 100 is embedded into the mobile phone body 211 as the LCD device 100 is driven by voltages within 2~5 volts to show an image, a symbol, a text content and so forth in the driving mode. As shown in FIG. 5A, an image or other symbols, text contents can also be displayed. Furthermore, as shown in FIG. 5B, the LCD panel 212 shows a purple color when no voltage is applied thereto. If the mobile phone body 211 is also designed in advance in a purple color, the color shown by the LCD panel 212 can be the same as the color of the mobile phone body 211, so as to realize a better aesthetic design when the backlight source 121 is either on or off.

Figure 6:
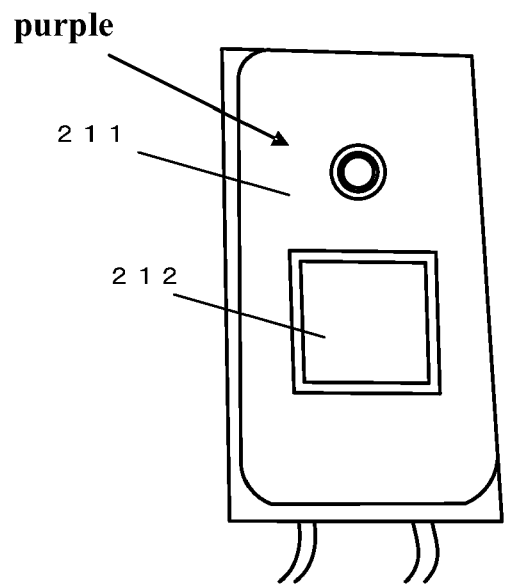
FIG. 6A and FIG. 6B show an illustration of another application example according to the present invention.
Figure 6:
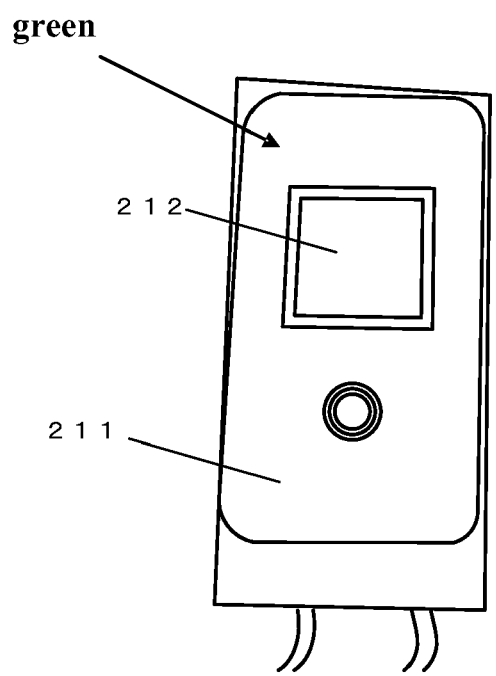

FIG. 6A illustrates another application example, in which the mobile phone body 211 and the LCD panel 212 show a purple color at the same time. FIG. 6B illustrates another application example in which the mobile phone body 211 and the display area of the LCD panel 212 both appear a green color at the same time. In the aforesaid application examples, the transmissive LCD is illustrated. However, the present invention is also adaptable to a transflective LCD or a reflective LCD. The LCD panel of the transflective LCD or the reflective LCD can show the predetermined color when no voltage is applied thereto as same as the transmissive LCD.

In the aforesaid embodiments, the mobile phone is illustrated but the LCD device of the present invention also can be employed in any electronic apparatus, such as, a digital camera, a Personal Digital Assistant, a notebook, a desktop computer, a television, a Global Positioning System, an vehicle display, an aeronautical display, a digital photo frame or a portable DVD player.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An LCD device, comprising:
    an upper substrate;
    a lower substrate; and
    a liquid crystal cell, disposed between the upper substrate and the lower substrate, and containing liquid crystals, wherein the liquid crystals are arranged to be set at:
        a first status being a transparent status by applying a first voltage to the liquid crystals,
        a second status being an opaque status by applying a second voltage different from the first voltage to the liquid crystals, and
        a third status by applying no voltage to the liquid crystals, the third status referring to a characteristic of transmissive light or reflected light of the liquid crystals having a predetermined color,
    wherein the color of the reflected light is the predetermined color by controlling a phase retardation of the liquid crystal cell during a period that no voltage is applied to the liquid crystals,
    wherein the phase retardation is set by deciding a birefringence of the liquid crystals and a thickness of the liquid crystal cell,
    wherein the LCD apparatus is a transmissive LCD or a reflective LCD,
    wherein the liquid crystal cell comprises conditions that:
        a twisted angle of the liquid crystals is at zero degree; and
        alignment directions of the upper and the lower substrates are the same, and
    wherein the phase retardation is of a range of 400 nm~1000 nm when the LCD device is the transmissive LCD, and the phase retardation is of a range of 200 nm~500 nm when the LCD device is the reflective LCD.

2. The LCD device of claim 1, wherein the first and second voltages applied to the liquid crystals for display are larger than a predetermined voltage.

3. The LCD device of claim 1, wherein the first and second voltages applied to the liquid crystals are within a range of 2~5 volts.

4. An electronic apparatus, comprising the LCD apparatus of claim 1.

5. The electronic apparatus of claim 4, wherein the electronic apparatus is a mobile phone, a digital camera, a Personal Digital Assistant, a notebook, a desktop computer, a television, a Global Positioning System, an vehicle display, an aeronautical display, a digital photo frame or a portable DVD player.

6. A display method of an LCD device, wherein the LCD device comprises an upper substrate, a lower substrate, and a liquid crystal cell containing liquid crystals, wherein the liquid crystals have a first, transparent status during a period a first voltage is applied to the liquid crystals and a second, opaque status during a period a second voltage different from the first voltage is applied to the liquid crystals, wherein the LCD device is a transmissive LCD or a reflective LCD, the display method comprising:
    controlling conditions of the liquid crystal cell to set a color of the transmissive light or reflected light of the liquid crystals to be a predetermined color such that the liquid crystals have a third status during a period no voltage is applied to the liquid crystals, the controlling conditions of the liquid crystal cell comprising:
        setting a twisted angle of the liquid crystals at zero degree;
        setting alignment directions of the upper and the lower substrates to be the same; and
        controlling a phase retardation of the liquid crystal cell during a period that no voltage is applied to the liquid crystals,
    wherein the phase retardation is set by deciding a birefringence of the liquid crystals and a thickness of the liquid crystal cell, and
    wherein the phase retardation is set of a range of 400 nm~1000 nm when the LCD device is the transmissive LCD and the phase retardation is set of a range of 200 nm~500 nm when the LCD device is the reflective LCD.

7. The display method of claim 6, wherein the first and second voltages applied to the liquid crystals for display are larger than a predetermined voltage.

8. The display method of claim 6, wherein the first and second voltages applied to the liquid crystals are within a range of 2~5 volts.

9. An LCD device, comprising:
an upper substrate;
a lower substrate; and
a liquid crystal cell, disposed between the upper substrate and the lower substrate, and containing liquid crystals, wherein the liquid crystals are arranged to be set at:
a first status being a transparent status by applying a first voltage to the liquid crystals,
a second status being an opaque status by applying a second voltage different from the first voltage to the liquid crystals, and
a third status by applying no voltage to the liquid crystals, the third status referring to a characteristic of transmissive light or reflected light of the liquid crystals having a predetermined color,
wherein the color of the reflected light is the predetermined color by controlling a phase retardation of the liquid crystal cell during a period that no voltage is applied to the liquid crystals,
wherein the phase retardation is set by deciding a birefringence of the liquid crystals and a thickness of the liquid crystal cell,
wherein the LCD apparatus is a transmissive LCD or a reflective LCD,
wherein the liquid crystal cell comprises conditions that:
a twisted angle of the liquid crystals is at zero degree; and
alignment directions of the upper and the lower substrates are in reverse, and
wherein the phase retardation is of a range of 400 nm~1000 nm when the LCD device is the transmissive LCD, and the phase retardation is of a range of 200 nm~500 nm when the LCD device is the reflective LCD.

10. An LCD device, comprising:
an upper substrate;
a lower substrate; and
a liquid crystal cell, disposed between the upper substrate and the lower substrate, and containing liquid crystals, wherein the liquid crystals are arranged to be set at:
a first status being a transparent status by applying a first voltage to the liquid crystals,
a second status being an opaque status by applying a second voltage different from the first voltage to the liquid crystals, and
a third status by applying no voltage to the liquid crystals, the third status referring to a characteristic of transmissive light or reflected light of the liquid crystals having a predetermined color,
wherein the color of the reflected light is the predetermined color by controlling a phase retardation of the liquid crystal cell during a period that no voltage is applied to the liquid crystals,
wherein the phase retardation is set by deciding a birefringence of the liquid crystals and a thickness of the liquid crystal cell,
wherein the LCD apparatus is a transmissive LCD or a reflective LCD,
wherein the liquid crystal cell comprises conditions that:
a twisted angle of the liquid crystals is at 180 degrees; and
alignment directions of the upper and the lower substrates are the same, and
wherein the phase retardation is of a range of 400 nm~1000 nm when the LCD device is the transmissive LCD, and the phase retardation is of a range of 200 nm~500 nm when the LCD device is the reflective LCD.

11. A display method of an LCD device, wherein the LCD device comprises an upper substrate, a lower substrate, and a liquid crystal cell containing liquid crystals, wherein the liquid crystals have a first, transparent status during a period a first voltage is applied to the liquid crystals and a second, opaque status during a period a second voltage different from the first voltage is applied to the liquid crystals, wherein the LCD device is a transmissive LCD or a reflective LCD, the display method comprising:
controlling conditions of the liquid crystal cell to set a color of the transmissive light or reflected light of the liquid crystals to be a predetermined color such that the liquid crystals have a third status during a period no voltage is applied to the liquid crystals, the controlling conditions of the liquid crystal cell comprising:
setting a twisted angle of the liquid crystals at zero degree;
setting alignment directions of the upper and the lower substrates in reverse; and
controlling a phase retardation of the liquid crystal cell during a period that no voltage is applied to the liquid crystals,
wherein the phase retardation is set by deciding a birefringence of the liquid crystals and a thickness of the liquid crystal cell, and
wherein the phase retardation is set of a range of 400 nm~1000 nm when the LCD device is the transmissive LCD and the phase retardation is set of a range of 200 nm~500 nm when the LCD device is the reflective LCD.

12. A display method of an LCD device, wherein the LCD device comprises an upper substrate, a lower substrate, and a liquid crystal cell containing liquid crystals, wherein the liquid crystals have a first, transparent status during a period a first voltage is applied to the liquid crystals and a second, opaque status during a period a second voltage different from the first voltage is applied to the liquid crystals, wherein the LCD device is a transmissive LCD or a reflective LCD, the display method comprising:
controlling conditions of the liquid crystal cell to set a color of the transmissive light or reflected light of the liquid crystals to be a predetermined color such that the liquid crystals have a third status during a period no voltage is applied to the liquid crystals, the controlling conditions of the liquid crystal cell comprising:
setting a twisted angle of the liquid crystals at 180 degrees;
setting alignment directions of the upper and the lower substrates to be the same; and
controlling a phase retardation of the liquid crystal cell during a period that no voltage is applied to the liquid crystals,
wherein the phase retardation is set by deciding a birefringence of the liquid crystals and a thickness of the liquid crystal cell, and
wherein the phase retardation is set of a range of 400 nm~1000 nm when the LCD device is the transmissive LCD and the phase retardation is set of a range of 200 nm~500 nm when the LCD device is the reflective LCD.

* * * * *